(12) United States Patent
Taranti et al.

(10) Patent No.: US 6,956,101 B2
(45) Date of Patent: Oct. 18, 2005

(54) METHOD AND INSTALLATION FOR EXTRACTING A MONOMER FROM AN AQUEOUS SLURRY CONTAINING A POLYMER

(75) Inventors: Philippe Taranti, Jemeppe-sur-Sambre (BE); Mario Golin, Jemeppe-sur-Sambre (BE)

(73) Assignee: Solvay (Societe Anonyme), Brussels (BE)

( * ) Notice: Subject to any disclaimer, the term of this patent is extended or adjusted under 35 U.S.C. 154(b) by 221 days.

(21) Appl. No.: 10/204,433

(22) PCT Filed: Mar. 1, 2001

(86) PCT No.: PCT/EP01/02405
§ 371 (c)(1),
(2), (4) Date: Jul. 7, 2003

(87) PCT Pub. No.: WO01/64308
PCT Pub. Date: Sep. 7, 2001

(65) Prior Publication Data
US 2004/0014938 A1 Jan. 22, 2004

(30) Foreign Application Priority Data
Mar. 2, 2000 (FR) .................................. 00 02806

(51) Int. Cl.$^7$ .................................................. C08F 6/24

(52) U.S. Cl. ........................ 528/501; 528/483; 528/500; 203/92; 203/96; 261/128; 261/148; 159/4.04; 159/16.3

(58) Field of Search .................................. 528/483, 500, 528/501; 261/148, 128; 203/92, 96; 159/4.04, 16.3

(56) References Cited

U.S. PATENT DOCUMENTS

| 3,926,927 | A | * | 12/1975 | Stookey ...................... 528/500 |
| 4,282,348 | A |   | 8/1981  | Wada |
| 4,367,331 | A | * | 1/1983  | Hager et al. ................ 528/501 |
| 6,332,958 | B1 | * | 12/2001 | Matsuda et al. .............. 203/49 |

FOREIGN PATENT DOCUMENTS

| EP | 0 756 883 | 2/1997 |
| GB | 1 506 983 | 4/1978 |
| GB | 2 028 836 | 3/1980 |

\* cited by examiner

*Primary Examiner*—Fred Teskin
(74) *Attorney, Agent, or Firm*—Oblon, Spivak, McClelland, Maier & Neustadt, P.C.

(57) ABSTRACT

Process and installation for extracting a monomer from an aqueous broth of a polymer, in which, after the broth has been heated, the broth is subjected to a depressurization in a depressurization chamber and is then introduced into a vertical column, divided into several chambers, on which are superimposed perforated plates, where the broth is flushed with an ascending stream of inert gas.

10 Claims, 3 Drawing Sheets

(A)   (B)

METHOD AND INSTALLATION FOR EXTRACTING A MONOMER FROM AN AQUEOUS SLURRY CONTAINING A POLYMER

The invention relates to a process for extracting a monomer from an aqueous broth of polymer.

Suspension polymerization is a technique that is commonly used to manufacture polyvinyl chloride. In this known technique, a vinyl monomer (vinyl chloride) is polymerized in the presence of an aqueous medium, and the polymerization is stopped before all of the vinyl chloride has been polymerized. In general, the polymerization is stopped when 80 to 95% of the amount of monomer has been converted into polymer. The result of this is that the aqueous broth of polyvinyl chloride collected after the polymerization contains an appreciable amount of residual vinyl monomer which should be removed.

Document EP-A-0 756 883 discloses an installation which is specially designed for treating such polyvinyl chloride broths, in order to remove therefrom the residual vinyl monomer they contain. This known installation comprises a vertical column, divided into a series of chambers on which perforated horizontal plates are superimposed. After preheating the aqueous broth to be purified to a temperature of about from 50° C. to 100° C., it is introduced into the column and flushed with an ascending stream of inert gas in order to extract the vinyl monomer it contains.

This known process is unsatisfactory in industrial practice. The reason for this is that disturbances are observed in the flow of the broth in the column, mainly in the case of a high flow rate. These disturbances especially involve spraying of the broth onto the walls of the column, at the entry to this column. They have a detrimental effect on the yield for the purification of the broth and run the risk of damaging the plates and the other constituent components of the column. One means for overcoming these disturbances is said to be to work with small flow rates of broth and low temperatures at the column inlet, but this would result in low production efficiency.

The invention is directed towards overcoming this drawback of the known installation described above and of the process which is carried out therein, by providing a novel process and an installation for carrying it out, which eliminate the risk of broth being sprayed at the column inlet, without harming its production efficiency.

Consequently, the invention relates to a process for extracting a monomer from an aqueous broth of a polymer, in which the broth is heated and is then introduced into a column in which it is flushed with an ascending stream of inert gas; according to the invention, after the broth has been heated and before it has been introduced into the column, it is subjected to a depressurization.

In the process according to the invention, the aqueous broth of the polymer contains the polymer in the form of solid particles dispersed in water. The amount of polymer in the broth is not critical. However, the viscosity of the broth should not exceed a value beyond which the flushing with the stream of inert gas would become impossible. In practice, the amount of polymer in the broth will depend on the nature of the polymer and should be determined in each case in practice by a routine laboratory investigation. For example, in the case of a vinyl polymer obtained by suspension polymerization, the broth may contain from 15 to 60% by weight of polymer.

The monomer present in the broth essentially comprises monomer from which the polymer is derived. It is generally residual monomer, which has not participated in the polymerization. The amount of monomer in the broth will consequently depend on the degree of conversion of the monomer into polymer. For example, in the case of a vinyl polymer and a vinyl monomer, the degree of conversion of the monomer into polymer is usually between 80 and 95%.

The heating of the broth serves to further extract monomer into a stream of inert gas. The optimum temperature for heating the broth will consequently depend on the polymer treated and on the viscosity of the broth. It should be determined in each particular case. In the case of vinyl polymers, recommended temperatures are between 50° C. and 120° C., temperatures of from 80° C. to 110° C. being especially advantageous.

In the column, the stream of inert gas serves to entrain the monomer which is in the broth. The term "inert gas" means a gas which is chemically inert with respect to the polymer, the monomer and water, under the temperature and pressure conditions prevailing in the column.

In accordance with the invention, after the broth has been heated and before it has been introduced into the column, it is subjected to a depressurization.

The term "depressurization" means a reduction in the pressure of the gaseous phase which is in contact with the broth. This may be carried out by any suitable technical means, one especially simple means consisting in introducing the broth into a large-volume chamber.

The Inventor has found that under the effect of the heating, a substantial portion of the monomer is vaporized and forms a pressurized gaseous phase above the broth. The depressurization operation consequently serves to remove the gaseous phase from the broth to reduce its pressure to a value close to (ideally equal to) that prevailing in the column, at the point at which the broth is introduced. The magnitude of the depressurization will depend on the heating and the volume of the broth, as well as the pressure prevailing in the column, and should consequently be determined in each particular case.

The invention also relates to an installation for carrying out the process according to the invention, this installation comprising, in a manner which is known per se, a vertical column, divided into several chambers on which are superimposed perforated platforms, a device for introducing the broth into at least one of the chambers, above a perforated platform, and a pipe for introducing an inert gas into the bottom of the column. In accordance with the invention, the device for introducing the broth into the column comprises a depressurization chamber, upstream of the column.

In the installation according to the invention, the column is designed to produce a circulation of the broth from the top downwards in the column, in counter-flow to an ascending stream of inert gas. To this end, the inert gas circulates vertically through the perforations in the plates and crosses a film of broth which circulates on these plates before falling into the chamber below the plate. An example of a column which is especially adapted to the invention is disclosed in document EP-A-0 756 883. In this known column, the upper face of the perforated plates has ribs which are arranged so as to form chicanes to circulate the broth. The chambers of the column are connected together by overspills at the edge of the plates.

In the installation according to the invention, the volume of the depressurization chamber should be sufficient to bring the preheated broth to the desired pressure.

In one advantageous embodiment of the installation according to the invention, the depressurization chamber comprises a cylindrical enclosure, the bottom of which is connected to the column (preferably to a top chamber of the column) and the headspace of which is in communication with the headspace of the column. This embodiment of the invention has the advantage of equilibrating the pressures in the column and in the depressurization chamber.

In one preferred embodiment of the invention, which has just been described, the broth is introduced into the depressurization chamber by means of a pipe which opens tangentially into the cylindrical enclosure. In this variant of the invention, the broth undergoes a circulate motion in the depressurization chamber, thus making it easier to separate the liquid phase (the broth) and the gas phase (the vaporized monomer).

The process and installation according to the invention are advantageously applied to polyvinyl polymer broths, containing a vinyl monomer which is residual from the polymerization. They apply most especially to polyvinyl chloride broths obtained by the suspension polymerization technique and which contain excess vinyl chloride from the polymerization.

Particular features and details of the invention will emerge from the description which follows of the figures of the attached drawing, which represent diagrammatically one particular embodiment of the installation according to the invention.

In these figures, the same reference numbers are used to denote identical components.

Figure 1:
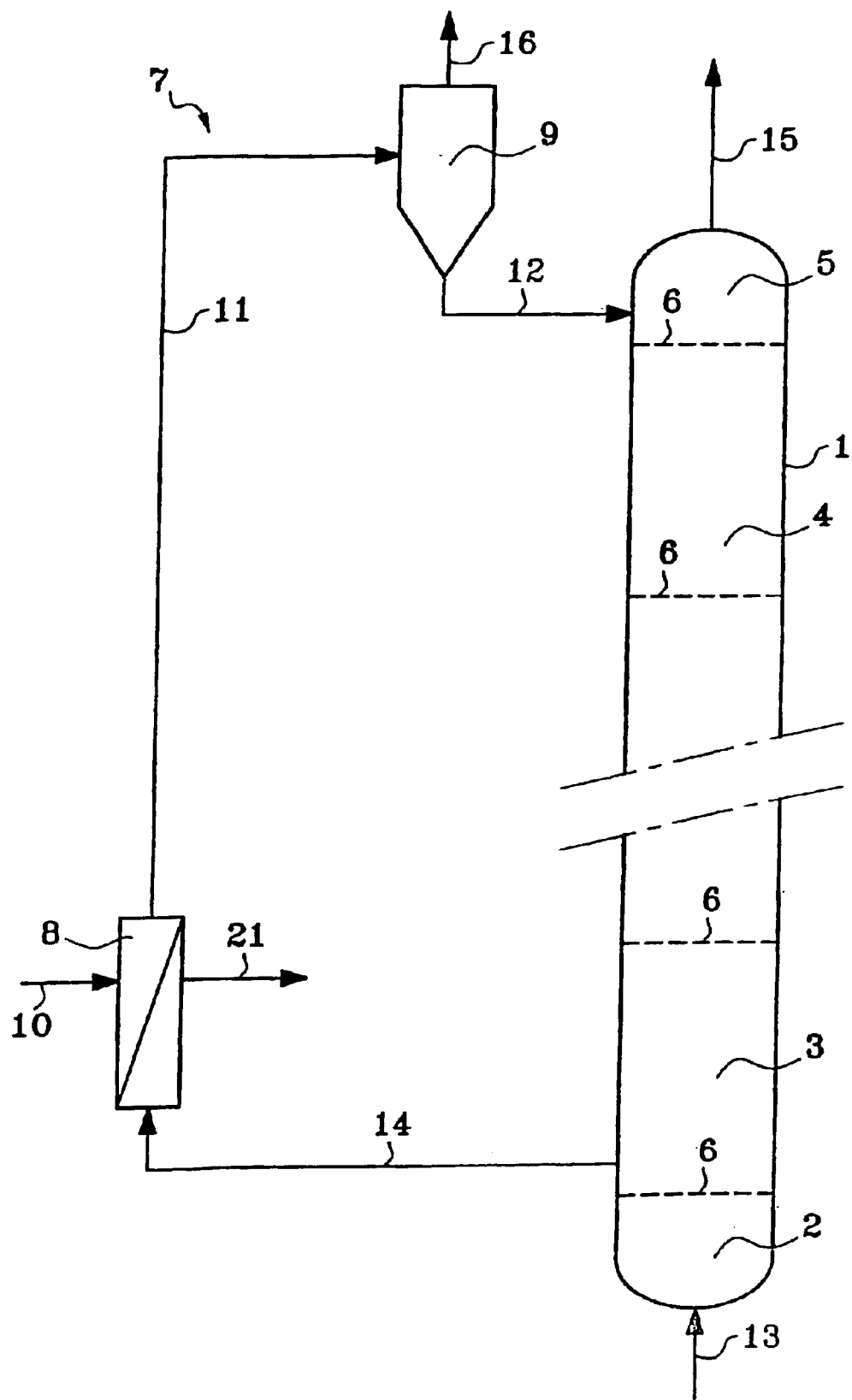
FIG. 1 is a scheme in elevation of one particular embodiment of the installation according to the invention.

The installation represented in FIG. 1 comprises a vertical column 1, divided into a succession of superimposed chambers 2, 3, . . . , 4, 5, by horizontal perforated plates 6. The top chamber 5 of the column is in communication with a device for introducing a polyvinyl chloride broth, denoted as a whole by the reference numeral 7. This introduction device comprises a heater 8, a depressurization chamber 9, a pipe 10 for introducing a broth into the heater, a pipe 11 for connecting between the heater 8 and the depressurization chamber 9, and a pipe 12 for connecting between the depressurization chamber 9 and the top chamber 5 of the column 1. A pipe 13 for introducing steam opens into the bottom chamber 2 of the column 1 and a pipe 14 connects the heater 8 to the chamber 3. Vents 15 and 16 are provided, respectively, at the top of the column 1 and at the top of the depressurization chamber 9.

Details concerning the column 1 and its functioning are available in document EP 0 756 883 A2.

Figure 2:
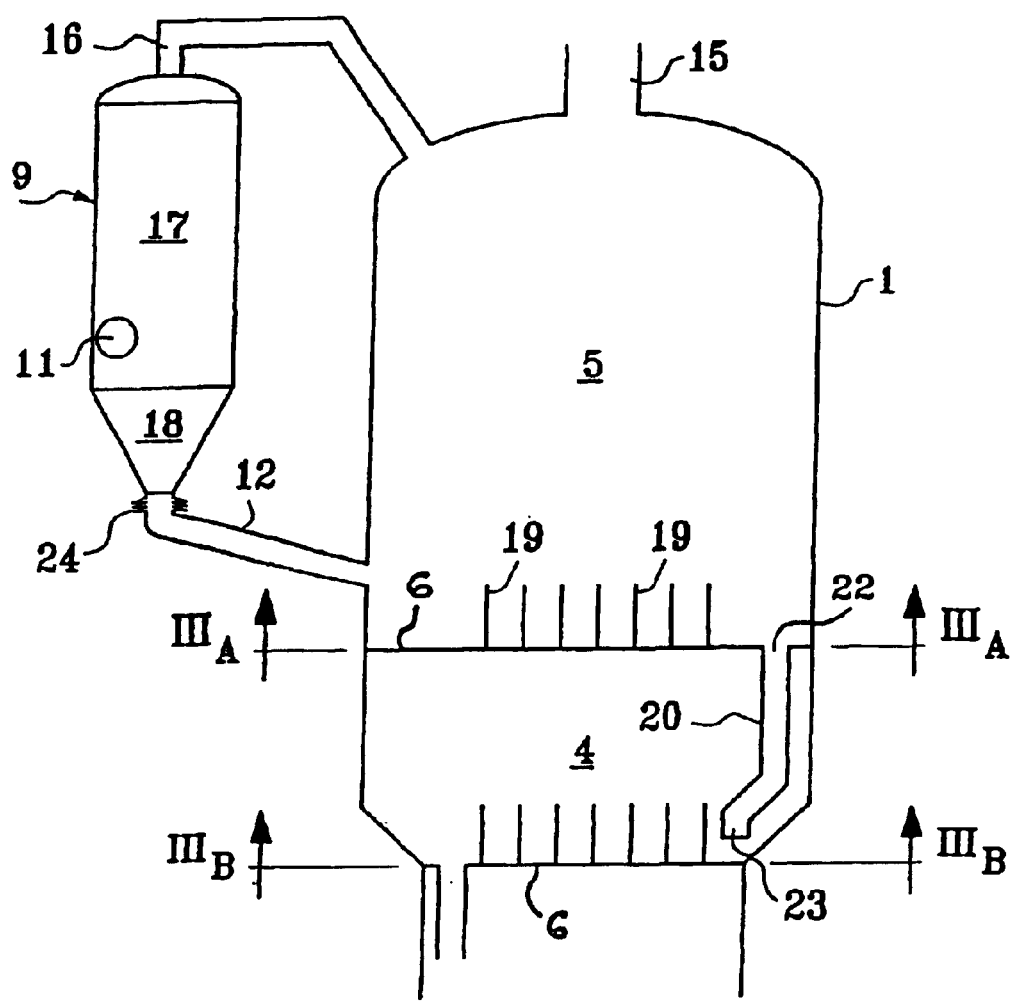
FIG. 2 shows a detail of the installation of FIG. 1 on large scale.

The depressurization chamber 9, which is visible on large scale in FIG. 2, comprises a vertical cylindrical body 17, which is extended downwards by a frustoconical body 18. The pipe 11 (which serves to introduce the broth into the depressurization chamber 9) opens into the cylindrical body 17, tangentially to its wall. The pipe 12 opens into the base of the frustoconical body 18 and into the bottom of the chamber 5 of the column 1. The junction of the pipe 12 with the frustoconical body 18 comprises an expansion joint 24. The vent 16 is moreover connected to the headspace of the top chamber 5 of the column 1, so as to equilibrate the pressures in the column 1 and in the depressurization chamber 9.

The installation in FIGS. 1 and 2 is especially adapted to the treatment of polyvinyl chloride broths obtained by the suspension polymerization technique. These broths are contaminated with vinyl chloride which is residual from the polymerization. In this particular application of the installation, the polyvinyl chloride broth obtained from the polymerization is introduced into the heater 8 via the introduction pipe 10. In the heater 8, the broth is heated to a temperature of about 100° C., which has the effect of vaporizing a fraction of the vinyl chloride monomer it contains and of raising the pressure. The hot broth under pressure is transferred from the heater 8 into the depressurization chamber 9 via the pipe 11. On entering the chamber 9, the broth undergoes a depressurization, releasing a gaseous phase containing vinyl chloride. The depressurization chamber functions in the manner of a cyclone, the broth therein being subjected to a circular circulation which facilitates and accelerates the separation of the gaseous and liquid phases. The liquid phase falls into the bottom of the frustoconical body 18, from which it passes into the top chamber 5 of the column 1, via the connecting pipe 12. The gaseous phase escapes from the top of the cylindrical body 17 via the vent 16 and enters the headspace of the top chamber 5 of the column 1.

In the top chamber 5 of the column, the broth falls onto the plate 6, where it circulates in the chicanes formed by a network of ribs 19, before reaching an overspill 20 into which it falls to reach the plate 6 of the subjacent chamber 4 of the column. The broth descends in this way gradually in the column 1, as far as the chamber 3. While it is circulating from the top downwards in the column 1, the broth is flushed with an ascending stream of steam which is introduced into the bottom of the column via the pipe 13. The result of flushing the broth with the stream of steam is that the vinyl chloride present in the broth is extracted and entrained to the top of the column. The steam containing vinyl chloride is removed from the headspace of the column 1 via the vent 15. The broth which reaches the chamber 3 is substantially free of vinyl chloride and is hot. It is removed from the column 1 via the take-off pipe 14 and is introduced into the heater 8 in which its substantial heat is used to heat the broth entering therein via the pipe 10. The broth cooled in the heater 8 leaves this heater via an extraction pipe 21.

Details regarding the circulation and treatment of the broth in the column 1 are available in document EP 0 756 883 A2.

Figure 3:
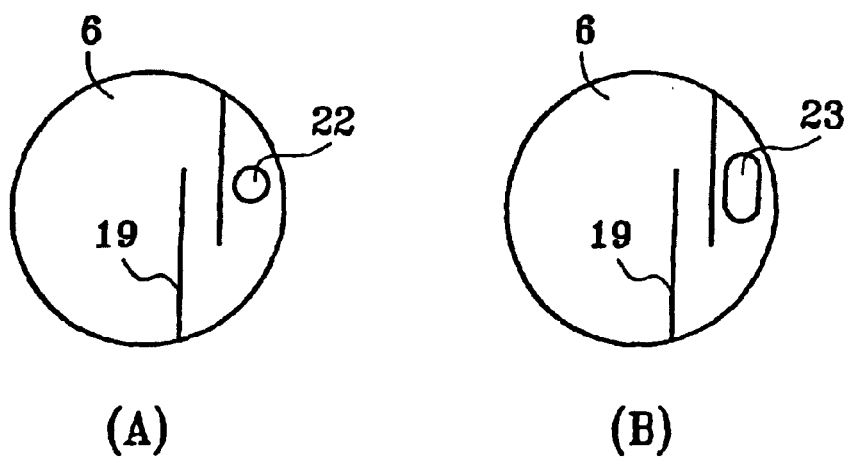
FIG. 3 shows two details of FIG. 2, in cross section, along planes $III_A$—$III_A$ and $III_B$—$III_B$, respectively.

FIG. 3 shows a constructive detail of one advantageous embodiment variant of the installation of FIGS. 1 and 2. In this variant of the invention, the overspill 20 connecting two successive chambers 5 and 4 of the column comprises a tube, the top of which 22 passes through the perforated plate separating the chambers 4 and 5, and the bottom 23 of which opens close to the perforated plate inside the chamber 4. The cross section of the top 22 is substantially circular, while the cross section of the bottom 23 is elongate. Moreover, the cross section of the bottom 23 is larger than that of the top 22, so as to compensate for the loss of pressure which the broth undergoes in the tube 20. The ratio between these two cross sections is, for example, between 1.5 and 3. The embodiment variant according to FIG. 3 has the advantage of rendering the rate of circulation of the broth in the column uniform.

What is claimed is:

1. Process for extracting a monomer from an aqueous broth of a polymer, comprising:
   heating the broth;
   introducing the broth into a column in which the broth is flushed with an ascending stream of inert gas; and
   after the broth has been heated and before the broth has been introduced into the column, the broth is subjected to a depressurization.

2. Process according to claim 1, wherein the inert gas comprises steam.

3. Process according to claim 1, wherein the polymer comprises a vinyl polymer and the monomer comprises a vinyl monomer.

4. Process according to claim 3, wherein the vinyl polymer broth is obtained by polymerization of the vinyl monomer in suspension.

5. Process according to claim 3, wherein the broth is heated to a temperature of from 80° C. to 110° C.

6. Installation for extracting a monomer from a broth of a polymer comprising:
- a vertical column, divided into several chambers on which are superimposed perforated platforms,
- a device configured to introduce the broth into at least one of the chambers, above one of the perforated platforms; and
- a pipe configured to introduce an inert gas into a bottom of the vertical column;
- wherein the device for introducing the broth into the vertical column comprises a depressurization chamber, upstream of the vertical column.

7. Installation according to claim 6, wherein the depressurization chamber comprises a cylindrical enclosure, a bottom of which is connected to a top chamber of the vertical column, and a headspace of which is in communication with a headspace of the vertical column.

8. Installation according to claim 7, wherein a pipe for introducing the broth into the depressurization chamber opens tangentially into the cylindrical enclosure of the vertical chamber.

9. Installation according to claim 6, wherein an overspill of the broth from one chamber of the vertical column into an immediately subjacent chamber of the vertical column comprises a tube, a top of which passes through a plate separating the chambers of the vertical column, and a bottom of which opens above a plate below the subjacent chamber, and wherein a first cross-section of the bottom of the tube is larger than a second cross-section of the top of the tube.

10. Installation according to claim 9, wherein a ratio between the first and second cross-sections of the tube is between 1.5 and 3.

* * * * *